United States Patent [19]

Thies et al.

[11] Patent Number: 4,917,741

[45] Date of Patent: Apr. 17, 1990

[54] PROCESS AND APPARATUS FOR MAKING AN ENDLESS CONVEYOR BELT, FOR JOINING ENDS OF A BELT AND FOR REPAIRING A BELT

[75] Inventors: Peter Thies, Ennepetal; Harald Fudickar, Solingen-Grafrath, both of Fed. Rep. of Germany

[73] Assignee: C. S. Fudickar KG, Wuppertal, Fed. Rep. of Germany

[21] Appl. No.: 277,338

[22] Filed: Nov. 29, 1988

[30] Foreign Application Priority Data

Dec. 16, 1987 [DE] Fed. Rep. of Germany ....... 3742651

[51] Int. Cl.⁴ .............................................. B32B 31/16
[52] U.S. Cl. .................................. 156/73.1; 156/73.6; 156/94; 156/580.1; 264/23; 264/69; 425/421; 425/456
[58] Field of Search ....................... 156/73.1, 73.6, 94, 156/580.1; 264/23, 69; 425/421, 456

[56] References Cited

U.S. PATENT DOCUMENTS 2,626,430  1/1953  Dawson ................................ 264/23
4,548,771  10/1985  Senapati et al. ...................... 264/23

FOREIGN PATENT DOCUMENTS 2055457  5/1972  Fed. Rep. of Germany .

Primary Examiner—Robert A. Dawson
Attorney, Agent, or Firm—Herbert Dubno

[57] ABSTRACT

The process for forming, or rendering endless or repairing a conveyor belt made of rubber and equipped with stress bearing inserts comprises providing a conveyor belt section with rubber material and preparing it for vulcanization, bringing it between heatable press platens and vulcanizing it using heat and pressure. The rubber has Newtonian flow properties and undergoes a hot pressing. The conveyor belt section is vibrated during vulcanization over a vibrational time period which is smaller than the vulcanization time.

9 Claims, 1 Drawing Sheet

PROCESS AND APPARATUS FOR MAKING AN ENDLESS CONVEYOR BELT, FOR JOINING ENDS OF A BELT AND FOR REPAIRING A BELT

FIELD OF THE INVENTION

Our present invention relates to a process and apparatus for making or repairing a conveyor belt and, more particularly, to a process and apparatus for making or repairing a rubber conveyor belt equipped with stress bearing inserts or reinforcement strands, and to a press and apparatus for joining such belt ends.

BACKGROUND OF THE INVENTION

Endless conveyor belts can be made, ends of belts can be joined, and conveyor belts made of rubber and equipped with stress bearing inserts can be repaired by providing a conveyor belt section with rubber material, preparing it for vulcanization, bringing it between heatable press platens and vulcanizing it using heat and pressure.

The rubber material provided to the conveyor belt section has Newtonian flow properties and the conveyor belt section undergoes a flow-producing hot pressing.

By "rubber material" we mean natural rubber and synthetic rubber including plastic or synthetic resin material as well.

A pressurized hot pressing is required in the vulcanization of the conveyor belt and/or on the conveyor belt so that the rubber mixture to be vulcanized fills all the hollow spaces in the structure of the conveyor belt section to be vulcanized and the enclosed air, also steam or water vapor released from moisture in the material used, can escape.

Pressure and temperature can be appropriately selected for the materials used. For example the temperature can be in the vicinity of about 150° C. Different vulcanization stages can be distinguished in the vulcanization of the rubber material. In fact the vulcanization is a cross-linking reaction in which the macromolecules of the rubber material are connected with each other by cross-linkages.

In the nonvulcanized state the rubber molecules are not fixed in position with respect to each other and can move about more or less freely. The rubber material is, particularly in the melt, plastically flowable or deformable. It has mechanical and thermodynamically irreversible Newtonian flow properties.

Currently during vulcanization the conveyor belt section between press platens moveable up and down but otherwise fixed is only acted on by a static pressure which acts perpendicularly to the plane of the conveyor belt section and for a sufficient duration.

To guarantee that all hollow spaces are filled satisfactorily pressures are required between 10 to 15 bar and correspondingly heavy presses. That is troublesome particularly when a mounting press is involved which is used on the working site to make an endless conveyor belt, e.g. for a mine for coal, lignite, ore, gravel or the like. For vulcanizations in which a hot pressing is not required in view of chemical effects considerably reduced pressures can be used, e.g. pressures between 3 and 5 bar.

OBJECT OF THE INVENTION

It is an object of our invention to provide a process and apparatus for forming rendering endless or repairing a conveyor belt made from rubber in which the hot pressing can be performed with considerably less pressure than is used currently.

SUMMARY OF THE INVENTION

This object and others which will become more readily apparent hereinafter are attained in accordance with our invention in a process and apparatus for forming, for rendering endless and/or for repairing a conveyor belt made of rubber and equipped with stress bearing inserts comprising providing a conveyor belt section with rubber material, preparing it for vulcanization, bringing it between heatable press platens and vulcanizing it using heat and pressure.

According to our invention, in the vulcanization the conveyor belt section is vibrated with a vibrational period (duration) smaller than the vulcanization time.

Advantageously, the conveyor belt section is vibrated only substantially in the vicinity of the pressurized Newtonian flow. Then a satisfactory filling of the hollow spaces occurs with pressures which are reduced in comparison to those currently used when the vibrational motion is provided only in the region of the hot pressing on the conveyor belt section to be vulcanized.

Advantageously with our invention previously used press pressures of 10 to 12 bar are no longer required. Usually pressures of only 2 to 3 bar are sufficient. That is because a dynamic pressure from vibrational motion is superimposed on the static press pressure which changes the flow properties of the Newtonian fluid so that the hot pressing occurs already at reduced static pressures and all the hollow spaces are satisfactorily filled. Also air and steam escape easier.

The vulcanization temperature is adjusted as it is in the conventional process, for example in a range around 150° C.

Frequency and amplitude of the vibrational motion may be easily adjusted and fixed for each conveyor belt structure by simple experiments. Of special advantage is the fact that the vibrational motion can be produced in an easy way and can be transmitted to the conveyor belt section to be vulcanized.

Moreover one of the press platens can be made to vibrate and is thus mounted so that it can vibrate and the vibration of that press platen is transmitted to the conveyor belt to be vulcanized.

One can, however, vibrate both press platens and the vibrational motion generated in both these press platens is desirably out-of-phase.

In one advantageous embodiment of our invention the press platen or platens can vibrate primarily in their own plane. However also vibrational motions whose amplitudes are directed perpendicularly to the press plate and thus toward the conveyor belt section to be vulcanized are effective in the process of our invention and allow the vulcanization to proceed at substantially reduced pressures.

Of course vibrational motions occurring substantially in the plane of the press platens and also orthogonal to it can be superimposed.

In the process according to our invention we can set strips in vibration which contact opposite lateral edges on the conveyor belt section to be vulcanized under pressure and the vibrational motion is transmitted from the lateral strips to the conveyor belt section.

During pressing with a hydraulic press pressure producing device, a vibration generator can act on the hydraulic pressurizing medium.

A variety of vibration generators, especially a mechanical vibration generator in the form of a weight-imbalance vibration generator and an electromagnetic vibration generator in the form of a piezoelectric vibrator or a magnetostrictive vibrator can be used to perform the process of our invention.

If a mechanical vibrator is used, our process can operate with vibration frequencies in the range from 100 to 200 Hz. Advantageously our process can then operate with vibration amplitudes in the millimeter range. However an ultrasonic vibration generator can also be used. Then one can operate with amplitudes which are fractions of a millimeter.

The object of our invention is also attained in an apparatus for performing the above process. This apparatus comprises a press frame and a plurality of press platens. At least one of the press platens is mounted so that it can vibrate and the press platen mounted so that it can vibrate is connected to a vibration generator.

In another embodiment of our apparatus strips are provided on both sides of the conveyor belt between the press platens on the conveyor belt section to be vulcanized.

At least one lateral strip along an edge of the belt is connected to a vibration generator.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
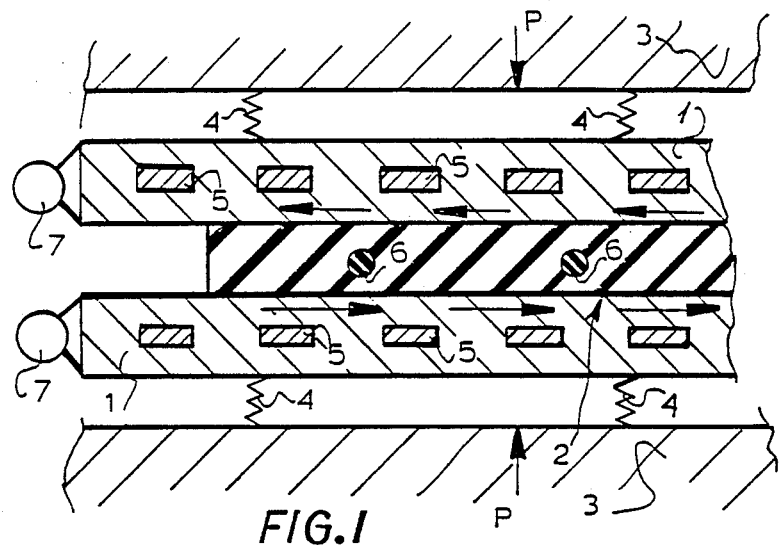
FIG. 1 is a cutaway cross sectional view of one embodiment of an apparatus according to our invention used for making or repairing a conveyor belt or for making a conveyor belt endless.

In the drawing two press platens 1 form an apparatus for performing the process according to our invention used in the vulcanization of a conveyor belt section 2.

In the embodiment of FIG. 1 the press platens 1 are connected to the press frame 3 in such a way that they can oscillate. Connection is through springs 4 as indicated schematically in FIG. 1. That was indicated schematically by the springs 4. The static press pressure which was indicated by the arrow P is transmitted by these springs 4 to the press platens 1.

The press platens 1 are heatable and equipped in this embodiment with heating elements 5. The conveyor belt section 2 shown in cross section is provided with wire cable 6 as a stress bearing insert.

An oscillatory motion is provided to each of the press platens 1 and of course by a weight-imbalance or mechanical vibration generator 7 which was indicated in the left in FIG. 1. The vibrational motions in both press platens 1 are out-of-phase with each other.

If the upper press platen 1 shifts left in this vibrational motion in the direction of the indicated arrows, then simultaneously the lower press platen 1 shifts to the right because of the phase shift or displacement. The frequency and amplitude of the vibrational motion can of course be varied. In any case the press platens 1 transmit their vibrational motion to the conveyor belt section to be vulcanized at least during flow-inducing hot pressing.

Figure 2:
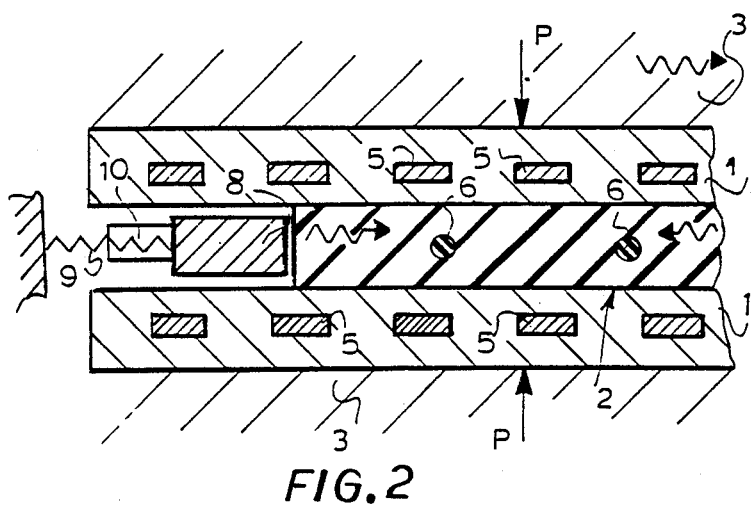
FIG. 2 is a cross sectional view, partly broken away, of another embodiment of an apparatus according to our invention used for making or repairing a conveyor belt or for making a conveyor belt endless.

In the embodiment according to FIG. 2 the press platens 1 are not mounted in the press frame 3 so that they can vibrate. One of the press platens 1 may be moved up and down, the other can be supported fixed on the press frame 3. The press pressure P acts as indicated with the arrow.

On the left in FIG. 2 a strip 8 is braced against an edge of the conveyor belt section 2 to be vulcanized; another similar strip can act on the opposite edge, not shown. Each strip is acted on by a pressurized positioning device 9 which is indicated as a spring. The strip 8 carries a vibration generator 10. When the vibration generator 10 operates this strip moves as indicated by the double arrow. Wiggling arrows indicated that in this way waves propogate in the conveyor belt section to be vulcanized, for example ultrasonic waves so that the vulcanization occurs during vibrational motion of the conveyor belt section to be vulcanized.

While certain novel features of our invention have been shown and described and are pointed out in the annexed claims, it is not intended to be limited to the details above, since it will be understood that various omissions, modifications, substitutions and changes in the forms and details of the apparatus illustrated and in its operation can be made by those skilled in the art without departing in any way from the spirit of our invention.

We claim:

1. In a process for forming, rendering endless or repairing a conveyor belt made of rubber and equipped with a plurality of stress bearing inserts, in which a conveyor belt section provided with rubber material and prepared for vulcanization is brought between a plurality of heatable press platens and is vulcanized using heat and pressure, said rubber material provided to said conveyor belt section having Newtonian flow properties and undergoing a hot pressing, the improvement wherein in said vulcanization said conveyor belt section is vibrated over a vibrational time period smaller than a time required for vulcanization, vibrational motion generated therefrom accelerating filling of all hollow spaces in said section, and said conveyor belt section is only vibrated substantially in the vicinity of said Newtonian flow.

2. The improvement defined by claim 1 wherein at least one of said press platens, mounted so said press platen can oscillate, is vibrated and said vibrational motion of said press platen is transmitted to said conveyor belt section to be vulcanized.

3. In a process according to claim 2 in which two of said press platens oscillate, the improvement wherein said press platens oscillate out-of-phase.

4. The improvement defined in claim 2 wherein at least one of said press platens oscillate primarily in a plane of said press platens, said plane being parallel to a length of said conveyor belt section.

5. The improvement defined in claim 1 wherein a strip which contacts laterally on said conveyor belt section to be vulcanized under pressure is directly vibrated separate from said platens and a vibrational motion of said strip is transmitted to said conveyor belt section.

6. The improvement defined in claim 1 wherein said process operates with vibration frequencies of from about 100 to 200 Hz.

7. The improvement defined in claim 6 wherein said process operates with vibration amplitudes in millimeter amounts.

8. The improvement defined in claim 1 wherein said process operates with ultrasonic vibration frequencies.

9. The improvement defined in claim 8 wherein said process operates with vibration amplitudes in a vicinity of a fraction of a millimeter.

* * * * *